W. J. McLEAN.
AMUSEMENT DEVICE.
APPLICATION FILED FEB. 19, 1909.

941,334.

Patented Nov. 23, 1909.
2 SHEETS—SHEET 1.

Witnesses
J. L. Wright
C. C. Hines

Inventor
William J. McLean,
By Victor J. Evans,
Attorney

W. J. McLEAN.
AMUSEMENT DEVICE.
APPLICATION FILED FEB. 19, 1909.

941,334.

Patented Nov. 23, 1909.
2 SHEETS—SHEET 2.

Witnesses
J. L. Wright
C. C. Hines

Inventor
William J. McLean,
By Victor J. Evans,
Attorney

UNITED STATES PATENT OFFICE.

WILLIAM J. McLEAN, OF EVERETT, MASSACHUSETTS.

AMUSEMENT DEVICE.

941,334.         Specification of Letters Patent.     Patented Nov. 23, 1909.

Application filed February 19, 1909. Serial No. 478,834.

*To all whom it may concern:*

Be it known that I, WILLIAM J. McLEAN, a citizen of the United States, residing at Everett, in the county of Middlesex and State of Massachusetts, have invented new and useful Improvements in Amusement Devices, of which the following is a specification.

This invention relates to an amusement device, its object being to provide an apparatus or toy constructed and operative to simulate the action of a horse or other animal diving from an elevation into a body of water, which device may be employed at amusement resorts and other public places and adapted, if desired, to be governed by a coin-controlled means, whereby, upon the deposit of a prescribed coin, a person may set the same in action.

The invention consists of the features of construction, combination and arrangement of parts hereinafter fully described and claimed, reference being had to the accompanying drawings, in which:—

Figure 1:
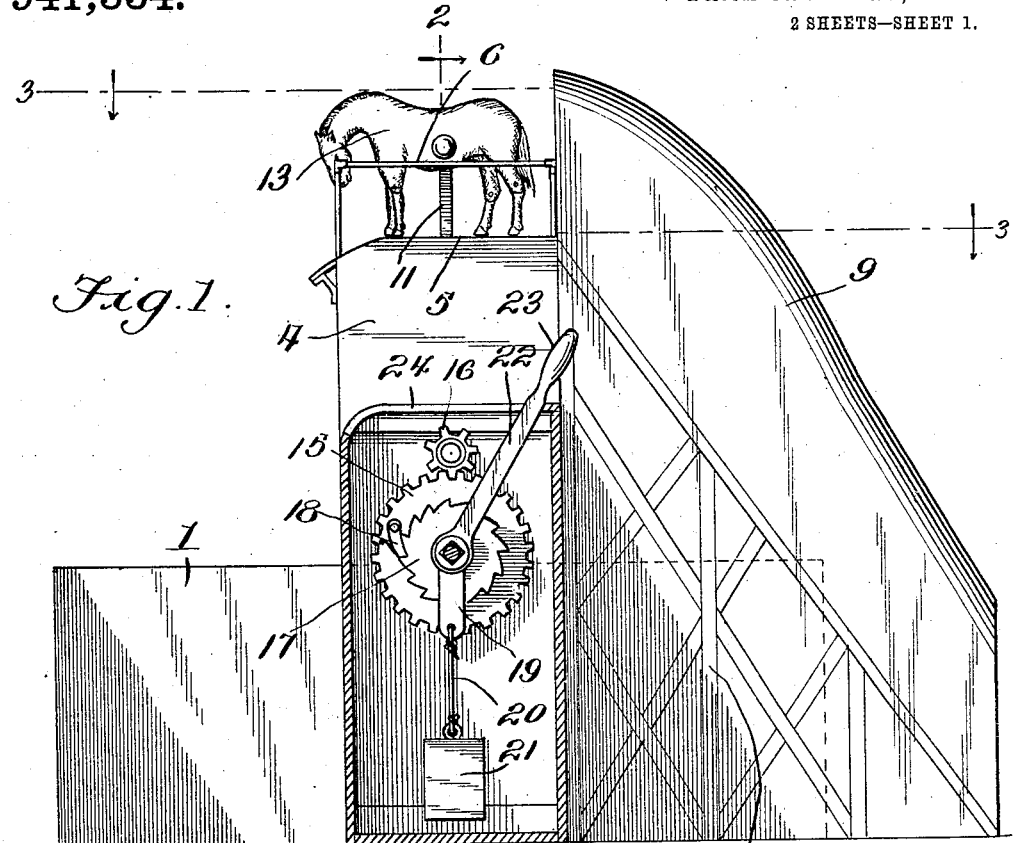
Figure 4:
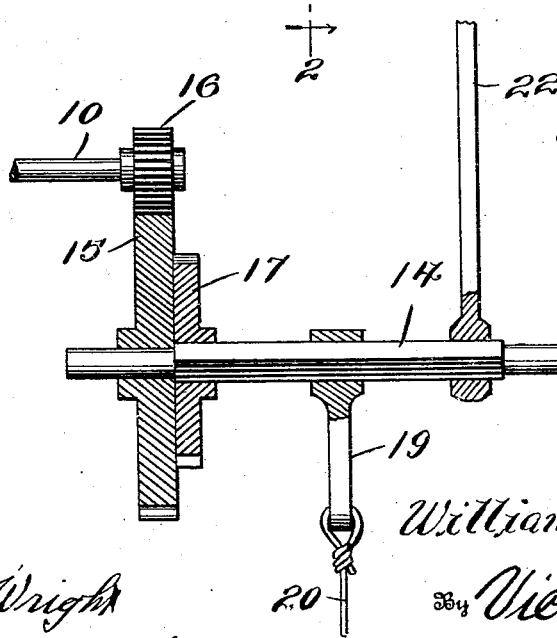
Figure 2:
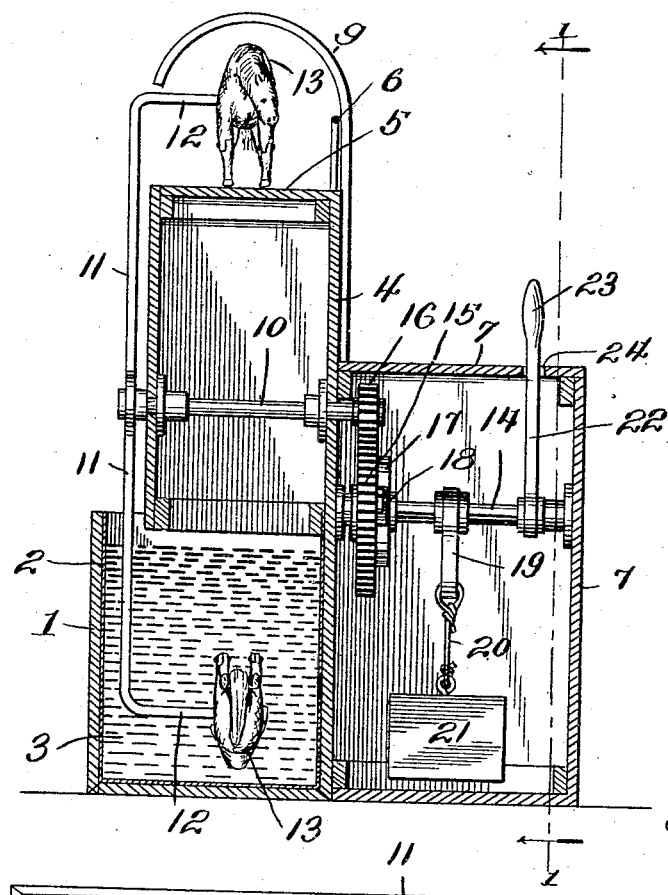
Figure 3:
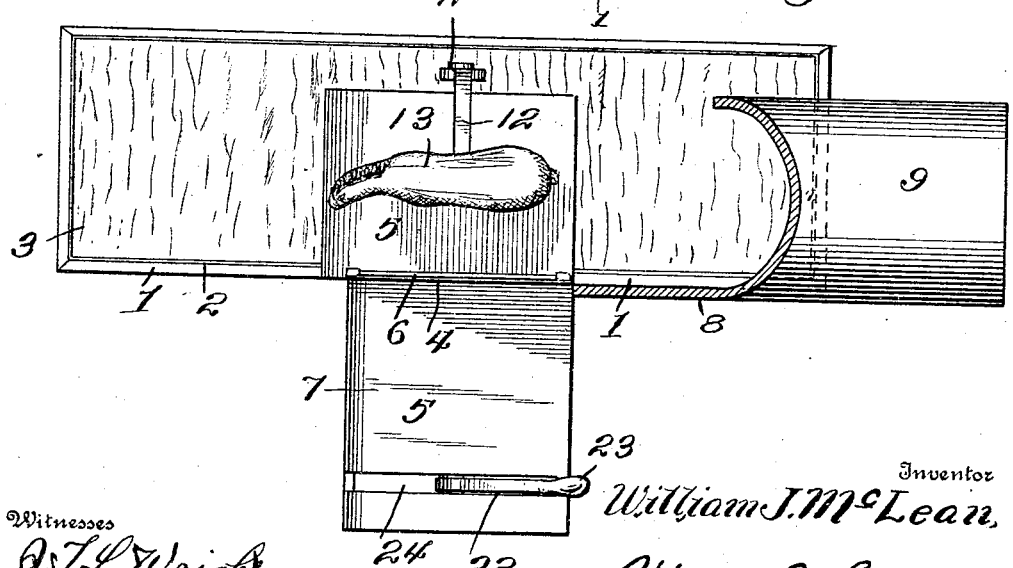

Figure 1 is a sectional side elevation of the device taken on line 1—1 of Fig. 2. Fig. 2 is a vertical transverse section taken on line 2—2 of Fig. 1. Fig. 3 is a sectional plan view taken on line 3—3 of Fig. 1. Fig. 4 is a sectional view of the motor gearing.

The frame of the device may be of suitable construction, and includes a longitudinal tank or receptacle 1, which, when made of wood, may be provided with a metal lining 2, and which is adapted to be filled with a charge of water 3 to a suitable elevation. The frame structure also includes an elevated box-like portion 4 which is arranged above the center of the tank and forms an upper supporting platform 5 having at its front side a guard rail 6. This rail 6 is employe for purposes of effect, and is disposed at the frotn side of the platform.

A gear or motor casing 7 is arranged at the front of the apparatus centrally of the tank and terminates below the portion 4, and forms an inclosure for the operating mechanism, as hereinafter described. At the front side of the tank and in rear of this casing 7 a supporting framework 8 is provided for a shield 9 which curves upwardly and rearwardly over the rear portion of the tank and terminates at its upper forward end at the rear of the platform 5. This shield is open at its rear side and forms a tunnel or passageway between the rear end of the tank and the rear end of the platform.

A shaft 10 extends horizontally and transversely through the walls of the frame portion 4 and is suitably journaled therein and carries at its rear end a pair of oppositely extending rods 11 having inwardly bent ends 12, on which are pivotally mounted in any suitable manner a pair of horses or other diving figures 13. This rotary carrier has its arms arranged to dip into the water of the tank successively on each half revolution thereof, and is designed and arranged in the normal operation of the apparatus to support one of the figures 13 above the platform 5 and the other within the tank, the upper figure having the appearance of a horse or other animal about to dive forwardly and downwardly from the front of the platform into the tank.

A drive shaft 14 is journaled in the casing 7 and carries at one end a loose driving gear 15 which meshes with a pinion 16 on the adjacent end of the shaft 10. On said shaft 14 is also a ratchet wheel 17, the teeth of which are adapted to engage a spring-actuated pawl 18 pivotally mounted on the gear 15 when said shaft is turned forwardly, and to ride freely in contact with the pawl when the shaft is turned rearwardly.

An arm 19 is fixed to the shaft 14 so as to hang pendent therefrom when the parts are in normal position, and suspended therefrom by a flexible connection 20 is a motor weight 21, which is adapted, when the shaft is turned forwardly, to be elevated by the movement of the arm, and thereby set for action to drop upon the release of the shaft for the purpose of turning the same backwardly to normal position. The shaft is adapted to be moved forwardly by an operating lever 22 having a handle 23 projecting upwardly through and movable within a longitudinal slot 24 formed in the top of the casing. This lever may, in practice, be normally held from movement by any suitable type of coin-controlled locking means, so that, upon the deposit of a prescribed coin, said lever will be free to be operated by the person depositing the coin.

The normal position of the parts is shown in Figs. 1 and 2, from which it will be seen that one of the animals 13 is supported above the platform 5 and with its feet resting thereon and apparently in position to dive from said platform into the tank. When the lever 22 is moved forwardly and the weight is elevated, the teeth of the ratchet wheel slide over the pawl 18, thus preventing movement of the gear 15. Upon moving the lever forward to its fullest extent, the operator releases the same, and the lever is thereby drawn back to its normal position by the dropping of the weight 21, thus turning the shaft back to its normal position. In this direction of movement of the shaft, one of the teeth of the ratchet wheel engages the pawl 18 and transmits motion to the gear 15 by which motion will be imparted to the shaft 10 to turn the carrier a half revolution and to thus reverse the position of the two figures 13, giving the effect of a figure diving from the platform into the water in the tank and then returning to the platform for a succeeding dive. It will be understood, of course, that the guard or shield 9 conceals the lower figure on its passage upward from the rear of the tank to the platform.

The device may be employed at fairs, excursion resorts and other public places, and may be partially inclosed within a transparent casing, leaving, however, the upper end of the lever free to be operated by a person desiring to manipulate the machine. It is intended in practice to employ a coin-controlled locking mechanism, as before described, so that the machine cannot be operated for the amusement of a person until such person deposits a prescribed coin as a fee for the amusement derived.

Having thus fully described the invention, what is claimed as new is:—

1. An amusement apparatus including a water tank, a platform arranged above the center of the tank, a shield between the rear of the tank and rear of the platform, a figure revolubly mounted for a downward movement from the platform to the tank and an upward movement from the tank to the platform, and means for operating said figure.

2. An amusement apparatus including a water tank, a platform arranged above the center of the tank, a shield forming a passageway between the rear portion of the tank and rear portion of the platform, a revoluble carrier, a figure supported by the carrier and movable downwardly and forwardly from the platform to the tank and upwardly and forwardly from the tank to the platform through said passageway, and means for operating the carrier.

3. An amusement device including a water tank, a platform supported above the tank, a rotary carrier provided with oppositely arranged figures movable over the platform and through the tank, and means for operating said carrier to successively carry the figures from the platform to the tank and vice versa.

4. An amusement device comprising a water tank, a platform arranged above the tank, a figure movable from said platform in an orbit through the water in the tank, an operating device automatically movable in one direction, and pawl and ratchet gearing between said figure and the operation device.

5. An amusement device comprising a water tank, a platform arranged above the tank, a rotary carrier, oppositely disposed figures mounted upon the carrier for movement over the platform and through the tank, gearing for operating the carrier, an operating device for actuating the gearing and clutch mechanism for permitting movement of said operating device independently of the gearing in one direction and to connect the operating device and gearing for simultaneous movement in the reverse direction.

6. An amusement apparatus including a water tank, a platform arranged above the center of the tank, a passageway between the rear of the tank and the rear of the platform, a rotary carrier movable in an orbit over the platform and through the tank, animal figures mounted on said carrier in opposed relation, and means for rotating said carrier to successively cause the figures to pass from the platform to the tank and from the tank back to the platform.

In testimony whereof I affix my signature in presence of two witnesses.

WILLIAM J. McLEAN.

Witnesses:
MYRA MORCOMBE,
MARGARET C. FRASER.